United States Patent
Holmes et al.

(10) Patent No.: US 8,234,954 B2
(45) Date of Patent: Aug. 7, 2012

(54) TRANSMISSION WITH INTEGRATED HOUSING FOR MOTOR AND CLUTCH

(75) Inventors: Alan G. Holmes, Clarkston, MI (US); Grantland I. Kingman, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 805 days.

(21) Appl. No.: 12/328,081

(22) Filed: Dec. 4, 2008

(65) Prior Publication Data

US 2010/0139452 A1 Jun. 10, 2010

(51) Int. Cl.
*F16H 57/02* (2012.01)
*F16H 57/04* (2010.01)
*F16H 61/00* (2006.01)
*H02K 7/20* (2006.01)
*H02K 17/44* (2006.01)
*H02K 19/38* (2006.01)
*H02K 47/00* (2006.01)
*B60K 6/42* (2007.10)

(52) U.S. Cl. ..... 74/606 R; 310/112; 310/113; 180/65.22

(58) Field of Classification Search ............... 74/606 R; 310/112, 113, 90; 180/65.1, 65.21, 65.22; 290/1 C See application file for complete search history.

(56) References Cited

U.S. PATENT DOCUMENTS

| | | | | |
|---|---|---|---|---|
| 4,449,422 A * | 5/1984 | Fuehrer et al. | ............... | 74/606 R |
| 6,561,336 B1 * | 5/2003 | Huart et al. | ............... | 192/70.252 |
| 7,284,313 B2 * | 10/2007 | Raszkowski et al. | ........... | 29/596 |
| 7,318,403 B1 * | 1/2008 | Huart et al. | ............... | 123/179.28 |
| 7,339,300 B2 * | 3/2008 | Burgman et al. | ............... | 310/112 |
| 7,607,220 B2 * | 10/2009 | Reed et al. | ........................ | 29/825 |
| 2007/0007830 A1 * | 1/2007 | Reisch et al. | .................. | 310/54 |
| 2007/0252462 A1 * | 11/2007 | Holmes et al. | ................ | 310/112 |
| 2007/0272455 A1 * | 11/2007 | Lang et al. | .................. | 180/65.2 |
| 2009/0212649 A1 * | 8/2009 | Kingman et al. | ............... | 310/91 |
| 2009/0251029 A1 * | 10/2009 | Reinhart et al. | ............... | 310/425 |
| 2010/0137090 A1 * | 6/2010 | Holmes | ............................. | 475/5 |

* cited by examiner

*Primary Examiner* — Tisha Lewis
(74) *Attorney, Agent, or Firm* — Quinn Law Group, PLLC

(57) ABSTRACT

A transmission has a motor assembly with a stationary portion surrounding a rotor. The transmission also includes a clutch housing. A transmission casing surrounds the motor and the clutch housing. The stationary portion is rigidly connected to and supported by the clutch housing. Thus, a separate housing for the motor/generator is avoided. The housing may also support one or more motor bearings, seals, clutch pistons, or clutch plates.

8 Claims, 3 Drawing Sheets

US 8,234,954 B2

TRANSMISSION WITH INTEGRATED HOUSING FOR MOTOR AND CLUTCH

TECHNICAL FIELD

The invention relates to a support housing within a transmission casing.

BACKGROUND OF THE INVENTION

Electric motors, such as those typically used in hybrid electromechanical powertrains for automotive vehicles, have a stator surrounding a rotor that is rotatable relative to the stator. The stator is grounded to a stationary member, such as a transmission housing or casing. It is important that the relative positions of the stator and rotor remain substantially constant in order to preserve a precisely sized gap between the stator and rotor. This is of special difficulty in the case of a vehicle transmission or other powertrain component, because the electric motor may be subjected to extreme vibration and mechanical shock from the travel of the vehicle over bumps or other rough terrain. The stator is grounded to the transmission casing by any of a number of methods, such as bolting or slip-fitting. The stator must maintain its position relative to the casing, both axially and radially, when the casing and/or stator expand and contract due to thermal variations. Stators are steel, as they must generate an electromagnetic field when energized in order to move the rotor. Casings may be of a different, non-ferrous material, such as an aluminum alloy or plastic, with a greater coefficient of thermal expansion than steel.

SUMMARY OF THE INVENTION

A transmission is provided with a housing that supports both a torque-transmitting mechanism and a portion of a motor assembly, and further addresses the need to maintain the integrity of the motor/assembly within the transmission casing under operating conditions that lead to thermal expansion. Specifically, the transmission has a motor assembly with a stationary portion surrounding a rotor. The transmission also includes a clutch housing. A transmission casing surrounds the motor and the clutch housing. The stationary portion is rigidly connected to and supported by the clutch housing. Thus, a separate housing for the motor/generator is avoided, reducing the number of components, which potentially minimizes assembly time and reduces weight to improve fuel economy. The housing may also support one or more motor bearings, seals, clutch pistons, or clutch plates.

The stationary portion may be a sleeve supporting a stator, or may be the stator itself. The stationary portion may be connected to the housing by welding, by bolts, or other fastening mechanisms, depending in part on the materials used for the housing and the stationary portion. In some embodiments, an annular ring may be inserted between the housing and the transmission casing. The annular ring may be configured to expand to maintain contact with the housing and the casing as operating temperatures rise. For example, the housing may be a ferrous material, while the casing is an aluminum material. An annular ring, such as a high temperature plastic ring, can expand to fill a gap between the housing and casing created by the different rates of thermal expansion of the different materials.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
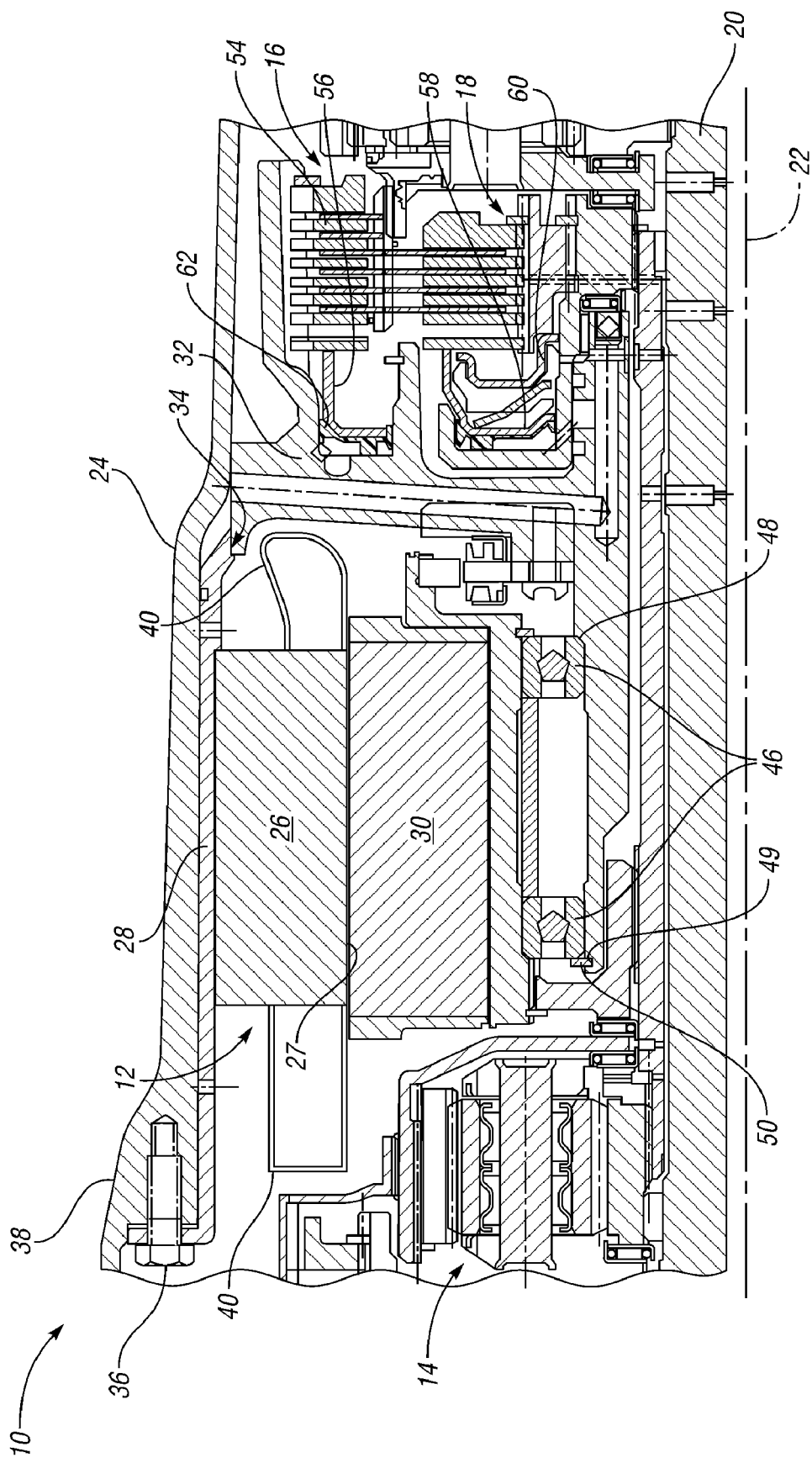
FIG. 1 is a schematic cross-sectional illustration of a first embodiment of a transmission having a motor/generator with a sleeve supporting a stator, the sleeve being welded to a clutch housing.

Referring to the drawings, FIG. 1 shows a portion of a transmission 10. The transmission 10 is a hybrid electromechanical transmission that has a motor/generator 12, a planetary gear set 14, a first torque-transmitting mechanism that is a stationary-type clutch 16, and a second torque-transmitting mechanism that is a rotating-type clutch 18, all of which are aligned coaxially with a shaft 20 that is rotatable about a center axis of rotation 22 and packaged radially inward of a transmission casing 24. Only portions of the components identified above that are located above the axis of rotation 22 as viewed in FIG. 1 are shown. Preferably, another motor/generator, additional gear sets (planetary or simple intermeshing gears), and additional torque-transmitting mechanisms, not shown, are included within the transmission and are controllable along with the motor/generator 12, planetary gear set 14 and clutches 16 and 18 to provide various operating modes of the transmission 10 to deliver torque along shaft 20, as is well understood by those skilled in the art.

Referring still to FIG. 1, the motor/generator 12 includes a stator 26. The stator 26 is retained to a sleeve 28 by splines (not shown), or otherwise, as is known. The motor/generator 12 and sleeve 28 together are referred to herein as a "motor assembly". As used herein, a "stationary portion" of the motor assembly may refer to either the sleeve 28 or the stator 26. The stator 26 surrounds a rotatable rotor 30. The size of an annular gap 27 between the stator 26 and rotor 30 is critical to the efficiency of the motor/generator 12 and the correspondence between energizing the stator 26 and resulting rotational speed of the rotor 30.

A stationary clutch housing 32, also referred to as a support housing, extends radially between the transmission casing 24 and the shaft 20. The clutch housing 32 serves a dual purpose as a housing supporting both the clutches 16, 18 and the motor/generator 12, and is accordingly referred to as an "integrated motor and clutch housing" or an "integrated motor and clutch support". The sleeve 28 is welded to the clutch housing 32 at an interface 34. The sleeve 28 is also bolted to the transmission casing 24 near an opposing end of the sleeve 28 with a series of bolts 36 threaded to bolt bosses 38 formed circumferentially about the transmission casing 24 (only one bolt 36 and boss 38 shown in FIG. 1). Because the sleeve 28 (and attached stator 26) is supported in part by welding the sleeve 28 to the clutch housing 32, an additional series of bolts and bolt bosses that would otherwise be used to join the sleeve 28 directly to the transmission casing 24 at the end of the sleeve near the housing 32, and thereby stabilize the stator 26, is avoided. Thus, the number of components in the transmission 10 is reduced, and radial packaging space required for the transmission 10 is minimal, as each set of bolts and bolt bosses necessitates a larger radius of the casing 24 at the next adjacent set of bolts and bosses. Additionally, integrating the sleeve 28 and the clutch housing 32 by welding eliminates the need for a separate radially-extending motor housing to support the sleeve 28 and stator 26. That is, radial support of the clutches 16, 18 and the stator 26 is accomplished by one housing 32, rather than two housings. It should be appreciated that the clutch housing 32 could alternatively be welded directly to the stator 26 rather than to the sleeve 28, in which case the housing 32 would be modified to extend further axially toward the stator 26 than is shown in FIG. 1.

The stator 26 must be a ferrous material in order to properly turn the rotor 30 when coils 40 are energized and in order to properly translate rotor torque into electrical energy when the motor/generator 12 is operated as a generator. Welding the sleeve 28 and clutch housing 32 is most advantageous when both the sleeve 28 and the clutch housing 32 are a ferrous material. The transmission casing 24 is typically a lightweight material, such as cast aluminum, that has a greater rate of thermal expansion than the ferrous sleeve 28. Thus, depending on the operating temperatures of the transmission 10, the sleeve 28 could loosen within the transmission casing 24. The bolts 36 (one shown) may sufficiently prevent rattling of the motor/generator 12 should such loosening occur. However, if the clutch housing 32 is also the same lightweight material as the transmission casing 24, such as an aluminum alloy, the housing 32 would expand radially at the same rate as the transmission casing 24, and loosening would not be an issue.

Figure 2:
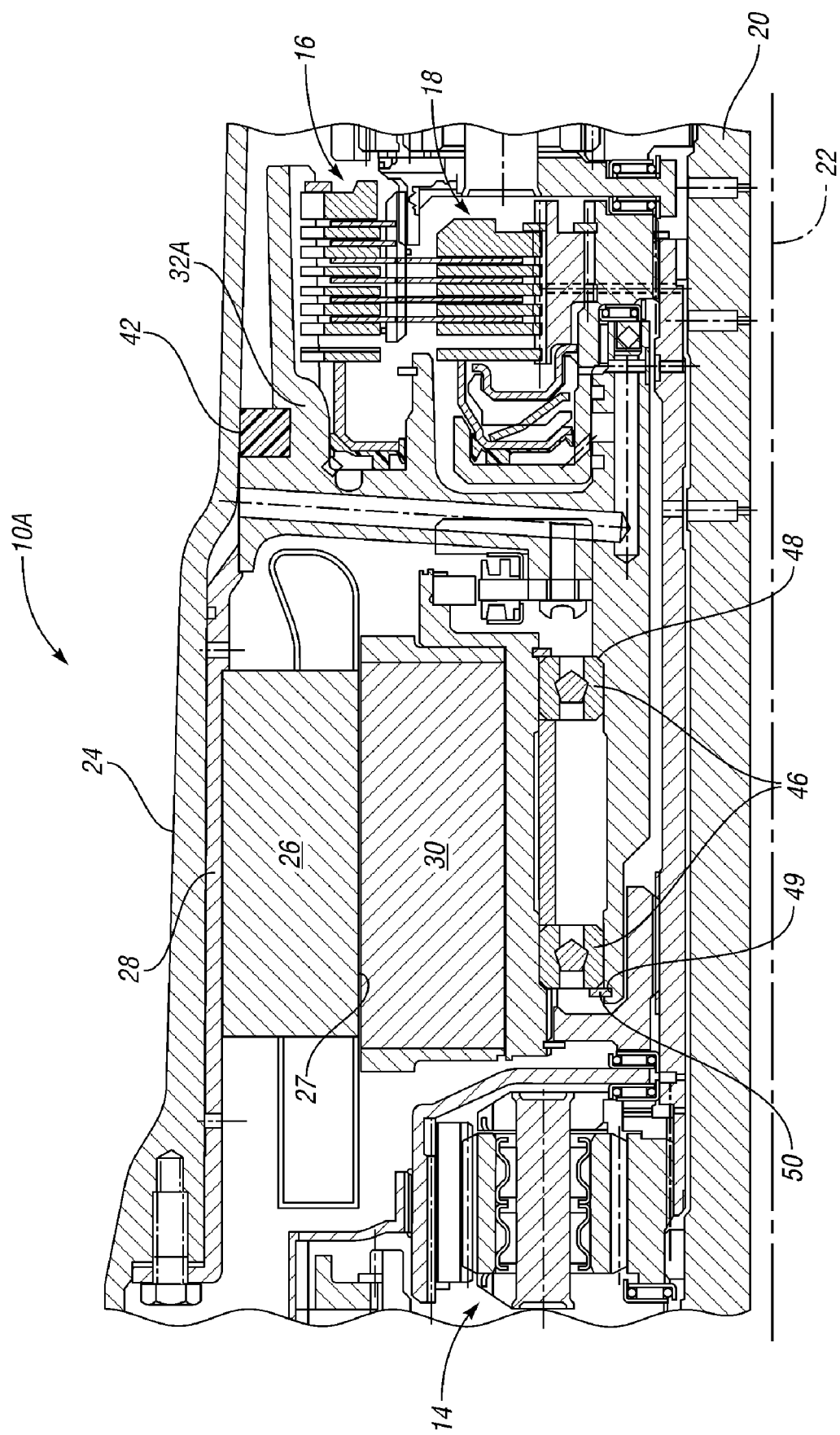
FIG. 2 is a schematic cross-sectional illustration of a second embodiment of a transmission having a motor/generator with a sleeve supporting a stator, the sleeve being welded to a clutch housing, and with an annular centering or "fitting" ring positioned between a transmission casing and the clutch housing.

In an embodiment wherein the sleeve is a ferrous material and the housing is also a ferrous material, an annular ring, referred to as a fitting ring, may be utilized to prevent issues related to differing rates of thermal expansion of adjacent components. Specifically, referring the FIG. 2, a transmission 10A substantially similar to transmission 10 of FIG. 1 is shown, and is referred to with like reference numerals identifying identical components. Ferrous sleeve 28 is bolted to transmission casing 24 which is an aluminum alloy. In this embodiment, clutch housing 32A is a ferrous material. When operating temperatures increase, the transmission casing 24 will expand at a greater rate than the sleeve 28 and housing 32A. Thus, the housing 32A is configured to support an annular fitting ring 42 around the housing 32A between the housing 32A and the casing 24. The ring 42 may be a high temperature plastic that expands at a rate of thermal expansion greater than that of the ferrous housing 32A and greater than that of the aluminum alloy casing 24 to fill the increasing gap between the housing 32A and casing 24 as operating temperatures increase.

Referring again to FIG. 1, in addition to supporting the sleeve 28 and the clutches 16, 18, the clutch housing 32 serves many other purposes. For example, motor bearings 46 positioned between the rotor 30 and the clutch housing 32 are supported by the clutch housing 32 to allow relative rotation of the rotor 30 with respect to the clutch housing 32. A step 48 formed in the clutch housing 32 and a notch 49 in the housing 32 containing a retaining ring 50 help to position the bearings 46 on the housing 32.

In supporting the clutches 16, 18, the housing 32 retains clutch plates 54, which are reaction plates of clutch 16. Furthermore, the housing 32 supports clutch apply pistons 56, 58 and 60, as well as seals for the clutches 16, 18 (see, e.g., seal 62).

Figure 3:
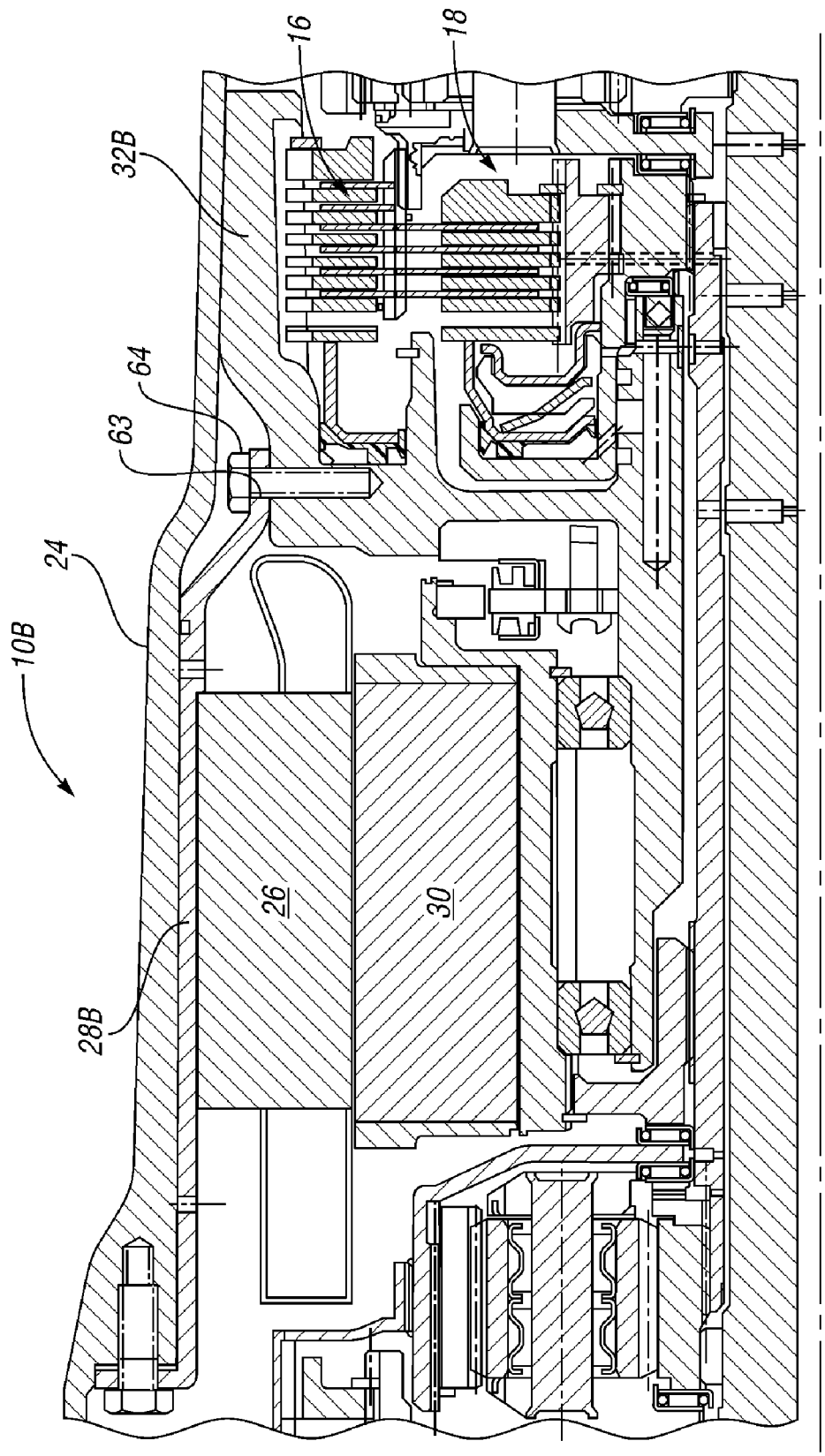
FIG. 3 is a schematic cross-sectional illustration of a third embodiment of a transmission having a motor/generator with a sleeve supporting a stator, the sleeve being bolted to a clutch housing.

Referring the FIG. 3, a transmission 10B substantially similar to transmission 10 of FIG. 1 is shown, and is referred to with like reference numerals identifying identical components. The sleeve 28B of FIG. 3 supports the stator 26 and is bolted to the transmission casing 24 near one end. The sleeve 28B has a fastener opening 63 that receives a threaded bolt 64 that aligns with a threaded opening in a clutch housing 32B. Thus, the sleeve 28B is bolted to the clutch housing 32B. The clutch housing 32B is configured to have an interference fit within the casing 24, at least at relatively low operating temperatures. At higher operating temperatures, if the casing 24 is an aluminum alloy and the housing 32B is the same aluminum alloy, the interference fit will be maintained. However, if the housing 32B is a ferrous material, the casing 24 will expand a greater amount than the housing 32B. In that instance, a fitting ring similar to ring 42 of FIG. 2 may be used to maintain a relatively tight fit.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
a transmission casing;
a housing extending radially within the transmission casing and nonrotatable with respect to the transmission casing; wherein the housing extends radially into contact with the transmission casing;
a motor assembly having a rotor and a stationary portion surrounding the rotor;
a torque-transmitting mechanism having a set of clutch plates; wherein the stationary portion and the set of clutch plates of the torque-transmitting mechanism are both supported within the transmission casing by the housing;
wherein the housing extends axially to support the rotor for rotation relative to the housing;
an annular ring radially surrounding the housing and positioned between the housing and the transmission casing; wherein the transmission casing is a first material with a first rate of thermal expansion; and wherein the stationary portion and the housing are a second material with a second rate of thermal expansion less than the first rate of thermal expansion; the housing and the annular ring thereby functioning to stabilize the stationary portion within the transmission casing.

2. The transmission of claim 1, further comprising:
at least one of a motor bearing, a seal, and a clutch piston supported by the housing.

3. The transmission of claim 1, wherein the stationary portion is bolted to the housing.

4. The transmission of claim 1, wherein the stationary portion is welded to the housing.

5. The transmission of claim 1, wherein the motor assembly further includes a stator; and wherein the stationary portion is a sleeve supporting the stator and radially surrounding the stator within the transmission casing.

6. The transmission of claim 1, wherein the annular ring is a third material with a third rate of thermal expansion.

7. The transmission of claim 1, wherein the annular ring is an integral portion of the housing.

8. The transmission of claim 1, wherein the transmission casing is an aluminum material, the housing is a ferrous material, and the annular ring is a plastic material configured to expand to maintain contact with the housing and the transmission casing as temperature rises.

* * * * *